(12) United States Patent
Blondel et al.

(10) Patent No.: US 10,373,372 B2
(45) Date of Patent: Aug. 6, 2019

(54) SYSTEM AND METHOD FOR OBJECT RECOGNITION

(71) Applicants: Danaë Blondel, Roquebrune sur Argens (FR); Laurent Juppé, Colombes (FR)

(72) Inventors: Danaë Blondel, Roquebrune sur Argens (FR); Laurent Juppé, Colombes (FR)

(73) Assignee: Applications Mobiles Overview Inc., Montreal (CA)

( * ) Notice: Subject to any disclaimer, the term of this patent is extended or adjusted under 35 U.S.C. 154(b) by 0 days.

(21) Appl. No.: 15/726,308

(22) Filed: Oct. 5, 2017

(65) Prior Publication Data

US 2019/0108677 A1    Apr. 11, 2019

(51) Int. Cl.
| | | |
|---|---|---|
| *G06T 17/05* | (2011.01) | |
| *G06T 7/10* | (2017.01) | |
| *G06T 15/20* | (2011.01) | |
| *G06T 7/55* | (2017.01) | |

(52) U.S. Cl.
CPC ............... *G06T 17/05* (2013.01); *G06T 7/10* (2017.01); *G06T 7/55* (2017.01); *G06T 15/205* (2013.01); *G06T 2207/10028* (2013.01)

(58) Field of Classification Search
CPC .. G06T 17/05; G06T 7/55; G06T 7/10; G06T 15/205; G06T 2207/10028; G06T 7/73; G06T 2207/10016; G06T 11/60; G06T 7/248; G06T 7/60; G06K 9/3233; G06K 9/00201; G06K 9/4671; G06K 9/00624; G06K 9/00664
See application file for complete search history.

(56) References Cited

U.S. PATENT DOCUMENTS

| | | | |
|---|---|---|---|
| 9,286,538 B1 | 3/2016 | Chen et al. | |
| 9,349,180 B1 | 5/2016 | Ramaswamy | |
| 9,424,461 B1* | 8/2016 | Yuan | G06K 9/00201 |
| 2014/0211989 A1* | 7/2014 | Ding | G06K 9/6211 |
| | | | 382/103 |
| 2017/0200307 A1* | 7/2017 | Saha | G06T 7/593 |

FOREIGN PATENT DOCUMENTS

| | | |
|---|---|---|
| KR | 10-1438011 | 9/2014 |
| WO | 2016/153690 A1 | 9/2016 |

* cited by examiner

*Primary Examiner* — Xilin Guo
(74) *Attorney, Agent, or Firm* — 24IP Law Group USA, PLLC; Timothy R DeWitt

(57) ABSTRACT

A computer implemented method for reconstructing a 3D point cloud of an object, and a method of object recognition of an object to be identified using the method for reconstruction of a 3D point cloud.

9 Claims, 8 Drawing Sheets

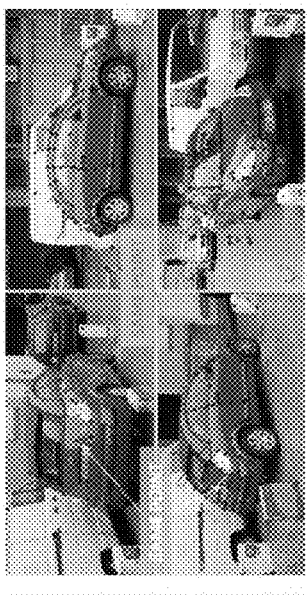
Fig. 3A
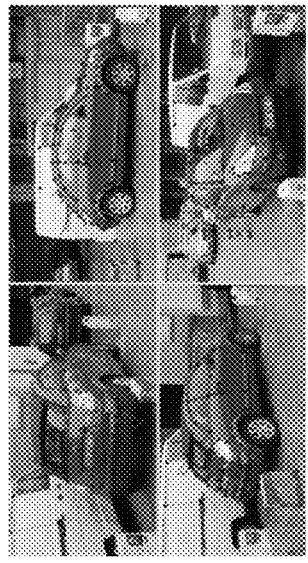
Searchable points 1032
Fig. 3B
Same Points (key points) 1030
Fig. 3C
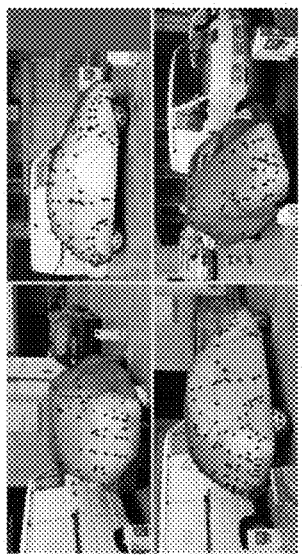
Fig. 3D
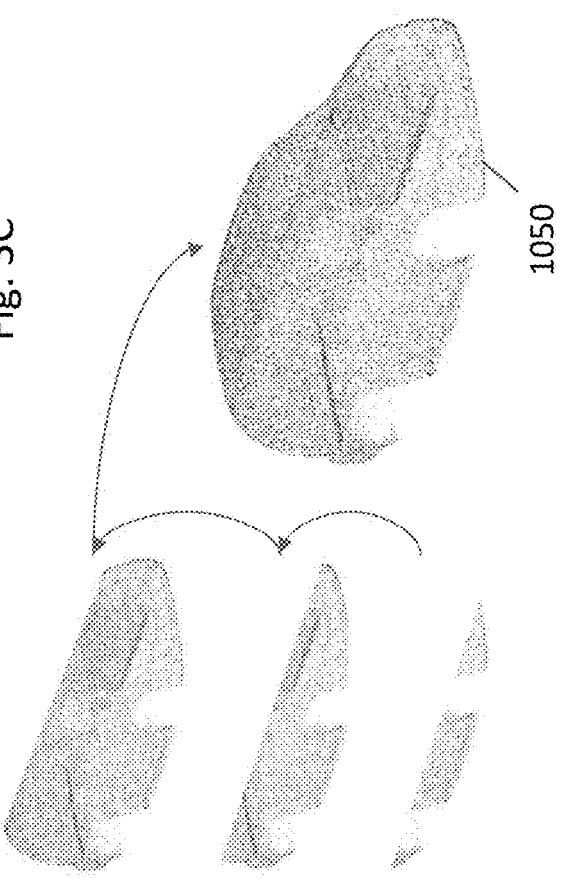
1050
Fig. 3E 20 pictures 30 pictures 120 pictures 150 pictures

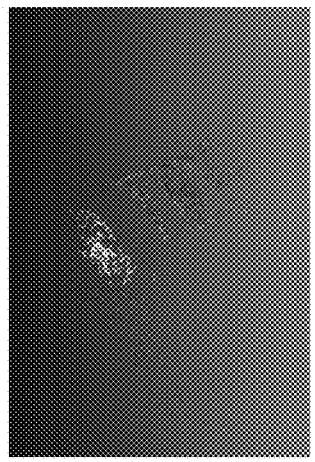
object
Fig. 5A
Points cloud (.ply) from database
Fig. 5B
Reconstructed points cloud (.ply)
Fig. 5C
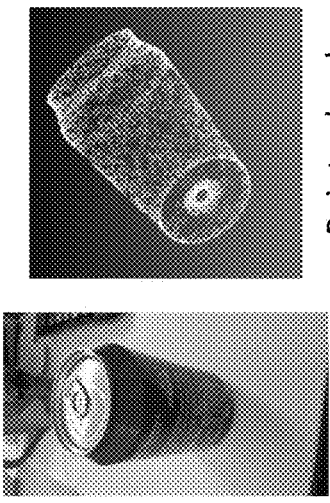
object
Fig. 5D
Reconstructed points cloud (.ply)
Fig. 5E
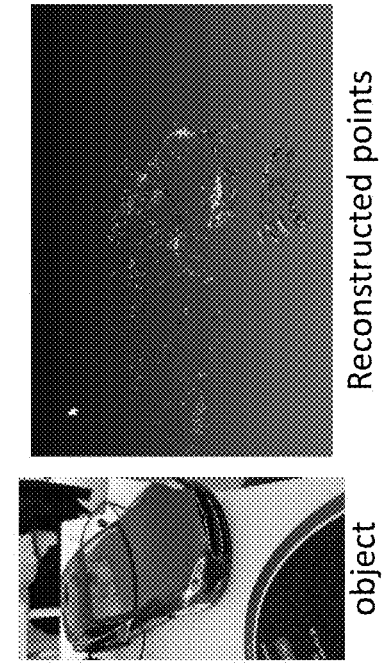
object
Fig. 5F
Reconstructed points cloud (.ply)
Fig. 5G
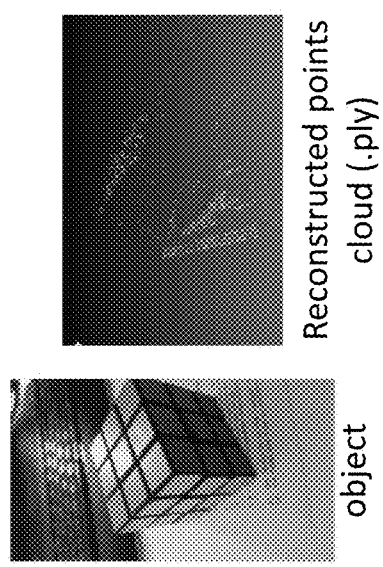

SYSTEM AND METHOD FOR OBJECT RECOGNITION

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

Searching, identifying, connecting an object to the network is one of the major issues of years to come. As we can see the World Wide Web becoming more and more mobile, this recognition processes and techniques have to be adapted to mobile users and thus mobile devices. Several techniques have yet been developed to do so, such as 2D picture analysis, optical character recognition (O.C.R.), QR-Codes or Bar-Codes, geolocation, color recognition. They prove very useful and efficient in particular cases, like O.C.R. for books, geolocation for monuments or QR-codes when present, but lack of efficiency in most cases. Indeed, objects in today's life are mainly defined in 3D and 3D parameters have to be taken in consideration to recognize them. Those parameters include peaks, tops, edges, shapes, reliefs.

An object of the invention is to propose a method for recognition of an object using 3D parameters, yet without scanning the object in 3D. With other words, the present invention's purpose is not to develop a 3D scanner but to use three dimensional parameters to recognize objects.

BRIEF SUMMARY OF THE INVENTION

The present invention proposes a computer implemented method of reconstructing a 3D point cloud of an object, the method comprising obtaining a plurality of pictures of the object, extracting a plurality of key points that can be correlated in said plurality of pictures of the object, wherein at least two pictures of the plurality of pictures show at least two different viewpoints of the object, placing the key points on the object, defining a plurality of 3D slices of the object, wherein a 3D slice comprises at least one key point, and adding the 3D slices to build a reconstructed 3D points cloud of the object.

The application is able to identify and treat essential 3D parameters as key points of an object, such as peaks, tops, edges, shapes, reliefs, as well as its texture, colors, materials . . . .

In one aspect of the disclosure, the method comprises defining an initial set of searchable points in a first picture of the plurality of pictures and identifying some of the searchable points in the remaining pictures of the plurality of pictures, to extract the key points.

In yet another aspect, the method comprises computing a calibration matrix in a reference frame, to derive a relative measurement system. The 3D slices may be added in the obtained relative measurement system.

The present invention further proposes a computer implemented method of object recognition of an object to be identified, the method comprising the steps of acquiring, by a mobile device, a plurality of pictures of said object, sending the acquired pictures to a cloud server, reconstructing, by the cloud server, a 3D model of the object, comprising performing the steps of the above method of reconstructing a 3D point cloud of an object, to derive the 3D points cloud reconstruction of the object, and performing a 3D match search in a 3D database using the 3D points cloud reconstruction, to identify the object, the 3D match search comprising comparing the 3D points cloud reconstruction of the object with 3D points clouds of known objects stored in the 3D database.

The general operating of the method of object recognition of an object of this disclosure is to observe an object with a device from as many angles as possible. The information acquired by the device is distantly computed and compared to information contained in an object database. As soon as a match is found, the object from the database is displayed. It is important to note that the object that is further used once recognized is the object from the database, not the one that has been captured.

The 3D approach of the present disclosure gives the opportunity to use 2D recognition techniques in all the view angles of an object, thus allowing watching and analyzing the object on all their sides and picking up every detail that will help to recognize the object. Unlike most approaches that are aiming to fully and densely reconstruct captured objects (3D scanning, facial recognition, printable 3D objects and formats), the present application uses calculated 3D parameters as a unique signature for an object. This is achieved using points clouds techniques which allow fast (within seconds) and efficient 3D representation of captured objects but also accurate comparison with an existing 3D database. Open source "Point Clouds Libraries (PCL)" and more recent "Geometry Factory Libraries" can be used for developing the software.

Should the object have an existing 3D representation, this representation can be displayed to the user in order to have a 3D interactive representation of the object; If this 3D pre modeled object be available, it could be printed through a 3D printer, . . . .

In one aspect, the method of object recognition comprises performing a first search match in a first database, the first search match being performed using 2D recognition techniques including at least one of Optical Character Recognition, SIFT based imaging, color gradient analysis.

The steps of the method may be performed concurrently, until the object has been identified in at least one of the first database or of the 3D database, in particular pictures are acquired as long as the object has not been acquired or until a time out has been reached. In other words, the method is an ongoing process.

In an aspect of the disclosure, the step of acquiring a plurality of pictures comprises extracting said pictures from a video sequence, the method comprising dynamically adjusting the acquisition parameter depending on the 3D points cloud reconstruction, wherein pictures from the video sequence are saved every «n» frame, and wherein «n» being adjusted dynamically or by the user, in particular wherein n is given a higher value at the start of the method and decreases as the re-construction becomes more accurate.

The search match in the 3D database may include at least one of machine learning or 3D geometric comparison.

In another aspect, the method comprises displaying in real time information pertaining to the method on the mobile device, wherein the mobile device comprises an input device allowing a user to enter input data concerning the object to be identified, and wherein the 2D or 3D match search are adapted depending on the input data.

The present invention further proposes a computer program product comprising a non-transitory computer medium having stored therein to cause a computer to perform the steps of a method of 3D point cloud reconstruction and/or the steps of a method of object recognition as defined above.

In the present application the term "object" is used to designate anything that can be captured by the device. It can be any object; natural, artificial, articulated, soft, hard . . . as long as a picture/video can be shot or taken to represent said object.

DESCRIPTION OF THE DRAWINGS

The invention is described hereinafter with reference to the enclosed drawings, in which:

FIGS. 3A-3E are examples of picture date at different stages of the method of FIG. 1.

FIGS. 5A-5G show examples of an object and its 3D reconstruction according to one aspect of the disclosure.

DETAILED DESCRIPTION OF THE INVENTION

Figure 2:
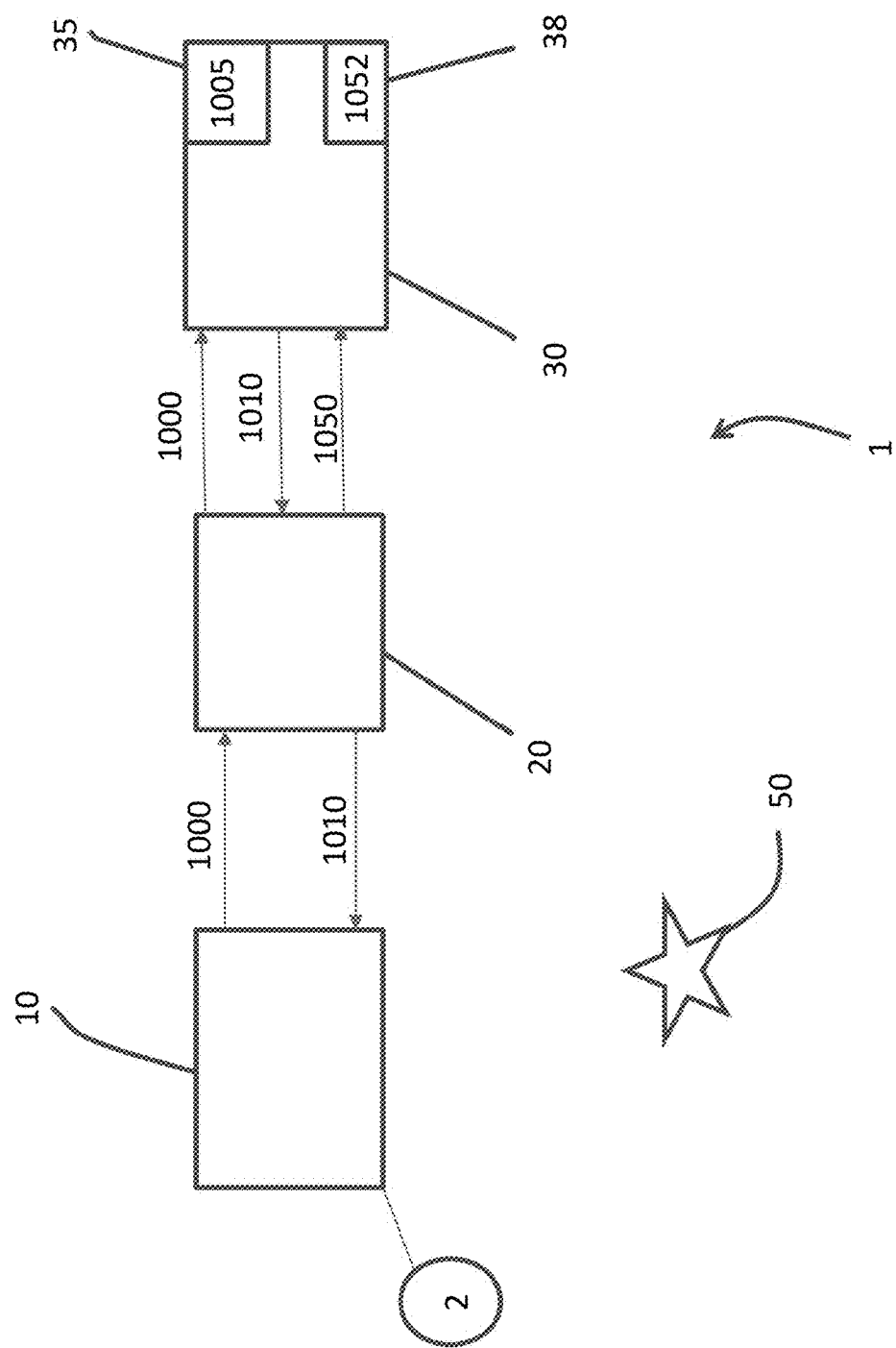
FIG. 2 is an overview of a system for object recognition according to one aspect of the disclosure.
Figure 4A:
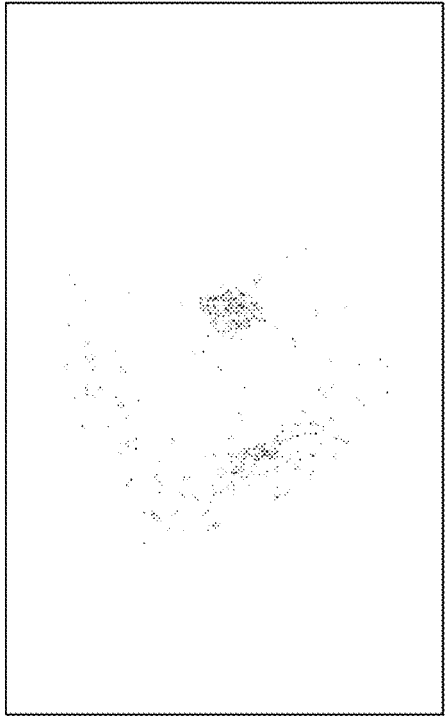
FIGS. 4A-4D show levels of 3D detail depending of the input number of pictures used in the method of FIG. 1.
Figure 4B:
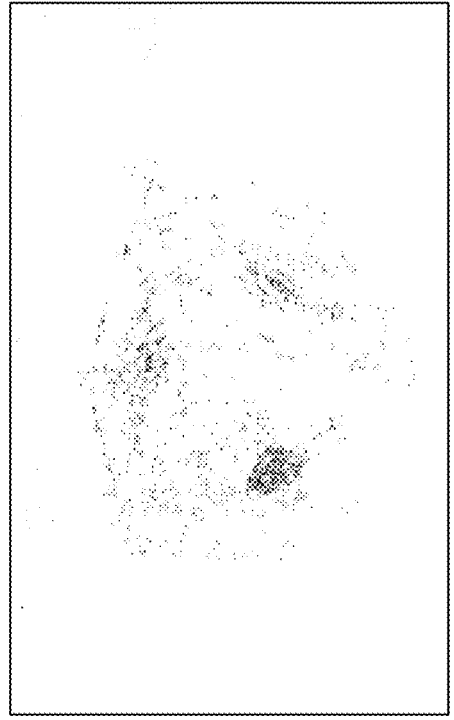
Figure 4C:
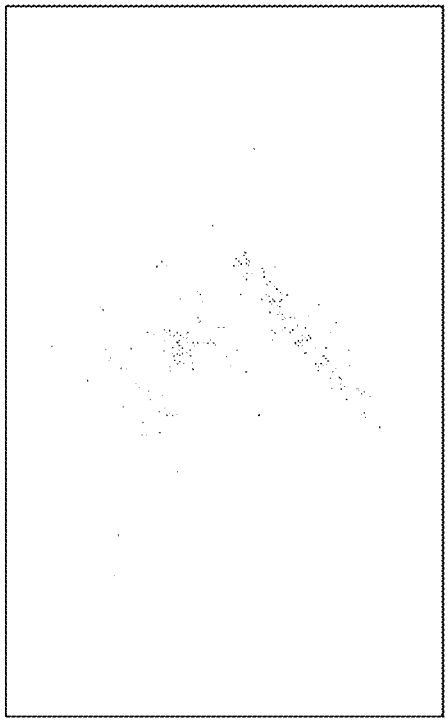
Figure 4D:
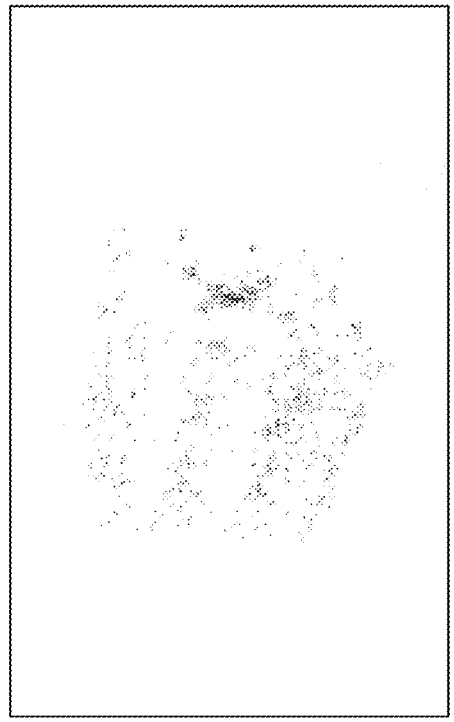

FIG. 2 is an overview of the system 1 for object recognition of an object 50. The system 1 comprises a device 10, which is used by an end user. The device 10 preferably comprises a display screen, camera and video camera, embedded CPU, storage capacities, a connection to a network. The device 10 may have connections to existing platforms 2, such as M-commerce, 3D printing, CRM, social networks.

For example, the device 10 can be a smartphone, a tablet, a laptop with web cam, a computer, or the like. As will be understood by the skilled person, smartphones and tablets are most efficient devices for the method of the present invention.

The device 10 is connected to a cloud server 20. The cloud server 20 comprises distant CPUs or GPUs facilities. The cloud server 20 can be mainly be provided by recognized actors in the domain, such as Azure (Microsoft), AWS (Amazon), Cisco, Google, HP, or more specialized cloud computing provider, as long as the providers offer efficiency, security and a worldwide presence. In one aspect of the disclosure, power and efficiency of the cloud server 20 can be adapted to the amount of calculation to be processed.

The cloud server 20 has a connection to a storage server 30. The storage server 30 is a distance storage involving both objects and user data, as will be explained in the present disclosure. The storage server 30 comprises a first database 35 and a second database 38. The first database 35 comprises stored images in a 2D dimension. The second database 38 comprises stored 3D files of images.

Figure 1:
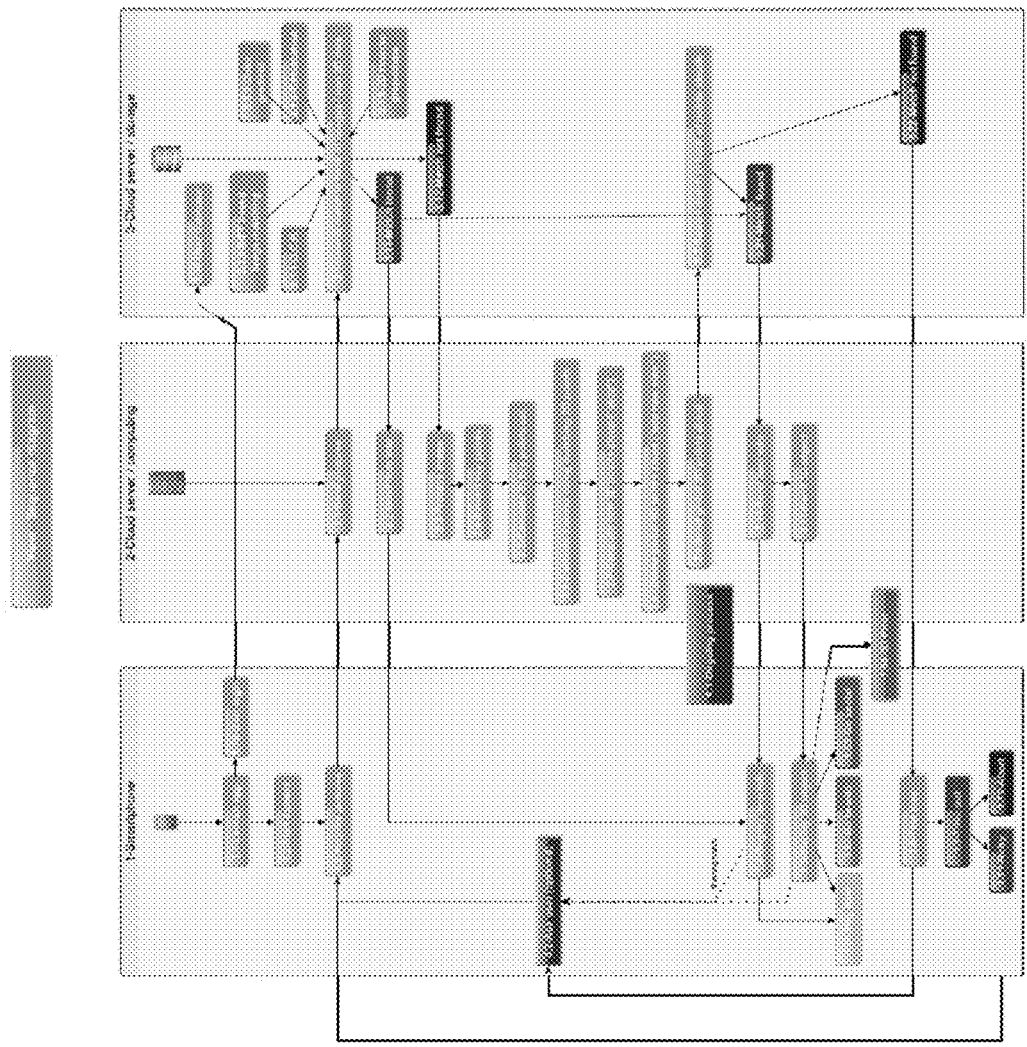
FIG. 1 is an overview of a method for object recognition in one aspect of the disclosure

FIG. 2 is an overview of a method for object 50 recognition according to one aspect of the invention, and described with reference to the system shown on FIG. 1.

The method comprises the step of acquiring a plurality of pictures 1000 of an object 50 (node 1.3). In one aspect of the invention, pictures can be acquired or captured by the device 10. Two different acquisition modes can be used: extraction from video or burst mode. In the burst mode, pictures are taken in photographic mode as quick as the device 10 allows it. The skilled person will understand that the acquisition of pictures using extraction from video is more automatic but also more space and CPU consuming. Pictures from a video sequence shot by the video camera of the user's device can be saved every «n» frame, «n» being adjusted dynamically or by the user, representing in some way the «quality» of the 3D scanning. For example, if n<10 frames, the quality is better but the process is slower. On the other hand, if n>50 frames, the scanning is of lower quality but the process faster. In an aspect of the disclosure, «n» is dynamically adjusted, starting with a high value (+/−50 frames) and decreasing as the reconstruction becomes more accurate (+/−10 frames)

The burst mode is more "clever" and should require some fine computing to select "proper" frames, i.e. frames that are useful for a more accurate 3D "cloud points" reconstruction. Examples of pictures 1000 are shown on FIG. 3A.

It should be noted that objects should preferably been shot from various angles. In case of big objects or objects that cannot be turned around like monuments, only specific angles can be used. The different pictures 1000 for the object 50 represents different views from the object, from different viewpoints.

The pictures 1000 are acquired until a full set of pictures is acquired.

A set of pictures may be considered completed after a certain acquisition time. For example, an acquisition time estimated to 10-15 seconds might be enough. Preferably, an overall time out can be set to avoid infinite looping in the process.

In one aspect of the disclosure, the length of the acquisition time is dynamic and may be adapted depending on a 3D points cloud reconstruction, as will be explained later in this disclosure with reference to nodes 2.3 to 2.9.

The device 10 sends the acquired plurality of pictures 1000 to the cloud server 20 for cloud computing (node 2.1). As will be explained in the following, a first 2D search match in the databank 35 and/or a 3D cloud reconstruction followed by a second 3D search match is performed.

The cloud server 20 forwards the plurality of pictures 1000 to the storage server 30.

A first search match in the database 35 may be performed in order to match the acquired pictures with a known image 1005 stored in the first database 35 (node 3.1).

The first search match is based on 2D image recognition techniques. Those 2D recognition techniques are implemented in the matching algorithm. Different 2 D recognition techniques can be implemented, such as open source techniques. The 2D recognition technique include at least one of O.C.R (node 3.1.1), Scale Invariant Feature Transform—SIFT based image matching (i.e. automatic recognition of key elements in a picture) (node 3.1.2), color gradient analysis (node 3.1.3) giving a precise color map of the object 50. Geolocation information (node 3.1.4) may be used as well.

Each time a non-fitting object stored in the database 35 is eliminated by either one of these techniques, database indexation is updated in order to ease the overall process.

Node 3.1.5 and fi. 6 describe an original approach referred to as "2D reverse projections from 3D objects". The 3D stored models of objects or 3D files of image in the database 35 are provided with complete metadata describing the object. For example, the metadata comprises the following identification data: name, brand, description, size, 2D parameters (colors gradients or maps, o.c.r. data, histograms, Fourier Transformations, samplings . . . ), 3D parameters (points cloud representations, triangulation, textures, materials, size, intrinsic dimensions . . . ). Among these parameters, it is assumed that the 3D representation of the objects generates numerous "random" 2D pictures, for an object. This "in house" piece of code generates a plurality of 2D pictures 2000 rendered from the 3D stored model, in order to simulate as many users' captures as possible. This includes different random lightings, different random points of view, different random exposures . . . and thus simulate a user's capture. This 2D pictures generation sends back, in 2D pictures, comparison through Hausdorff distance or Kullback-Leibler distance for example.

Therefore, the 2D reverse projections from 3D object is adapted to simulate the capture of the object 50 by the user and to propose as many "artificial" pictures 2000 as possible to compare them to the picture set 1000 of the object 50 sent by the user. 2D comparison of the artificial pictures 2000 and of the acquired pictures 1000 is processed along the other techniques for final matching.

If the first search match is successful, the storage server 30 sends item 1010 of relevant information belonging to the known image 1005 back to the cloud server 20 which forwards said item 1010 to the device 10 for display.

The item 1010 may comprise identification information of the object, a picture of the object, a localization information of the object, and the like.

If the first search match is not successful, the storage server 30 returns the information to the cloud server 20 that the first search match was not successful (node 3.12). The cloud server 20 starts a 3D reconstruction process in order to obtain a cloud of 3D points from the 2D picture set, followed by a followed by a 3D search match.

This 3D reconstruction process, done by cloud server 20, is shown in nodes 2.3 to 2.9. As will be detailed below, the 3D reconstruction process includes an identification of the 2D pictures set, a 2D tracking in the pictures, a 3D points set placement and 3D points cloud reconstruction. openMVG libraries may be used or any libraries known to the skilled person.

The pictures 1000 are analyzed at node 2.3 to identify the pictures 1000 and extract identification information pertaining to the picture set, such as the acquisition mode, the length of frame acquisition, the identification of frames for the 3D cloud reconstruction.

Using this identification information, a key point extraction process is launched on the pictures 1000, in order in order to extract key points 1030. Key points are defined as being points that can be correlated in as many pictures as possible.

The key points 1030 are identified by a 2D tracking process throughout all the pictures 1000 of the set of pictures, in which each point from a picture is identified in other pictures. If the pictures were acquired though a video, pictures corresponds to frames of the video. In other words, an initial set of searchable points 1032 is defined in a first picture, and the 2D tracking process tries to identify the searchable points 1032 in the other pictures of the set to extract the key points 1030. This is shown on FIGS. 3B and 3C.

The searchable points are refined throughout the process. Points are added, other are suppressed. During the key point extraction process, the set of key points is compared to the initial set of searchable points. Should the number of key points be too low, other searchable points would have to be added to the initial set of searchable points in order to be tracked again. There is no really minimum in the number of key points to be tracked, but the 3D reconstruction and the following comparison process is more efficient with dozens of points, as illustrated on FIG. 4 showing a level of 3D detail depending of the input number of pictures The skilled person will further understand that it is important that the object 50 has to be motionless while being captured, to allow a successful key point extraction process.

In order to reconstruct 3D points cloud, the "virtual world" is preferably calibrated to obtain a relative measurement system Indeed, the system will generally not be able to calculate absolute dimensions from the pictures set unless there is in at least one picture a distance reference, i.e. an object 50 which size/dimensions are known. Most of the time, this will not be the case. However, the object 50 will have coherent dimensions although it will not have the right size and proportions. For example, should the end user scan a mug, the system will recognize that the object 50 is a mug but won't be able to determine if this is a regular mug or the same mug in a giant version that could be exposed in front of a store as an advertising totem. Nevertheless, the system will send back an "OK" to the user, considering the mug is a regular one that can be found, bought, shared.

This calibration is made using triangulation algorithms. If two or more cameras whose positioning is well known in space see a specific point, triangulation based on elementary trigonometric formulas can determine the exact position of this specific point in space (i.e. in 3 dimensions). In the reverse process, if one tracked point is seen from different viewpoints (even though these different viewpoints are given by one single moving device), these different viewpoints can be positioned in a 3D space relatively to the tracked points, and thus the captured object.

The calibration is done at node 2.5, in which a camera calibration is done using matching 2D points, as explained below.

In order to reconstruct 3D points clouds from sets of pictures, the 2D pictures should be replaced in a 3D environment, by providing the answers to the following questions: where in space are the pictures taken from, and where in space are located the 2D tracked points.

Figure 6:
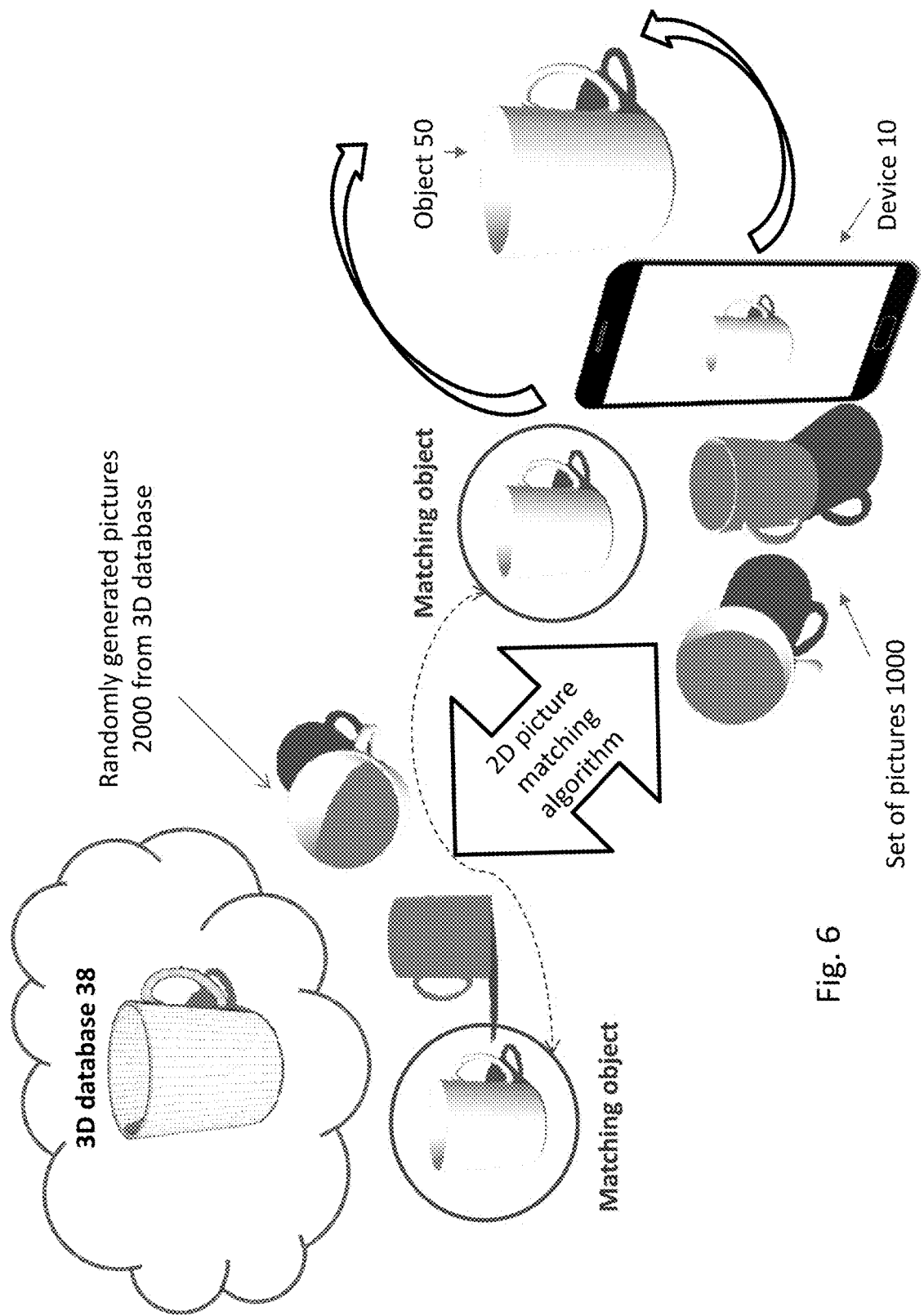
FIG. 6 is an overview of a method for generating random pictures for 2D picture matching used for object recognition according to one aspect of the disclosure.

The geometrical system at the time of capture can be represented on FIG. 6. The device 10 is represented here through its optical center O and his focal plane ("image plane"). The image of the object 50 is made of numerous points $P(X,Y,Z)$. The correspondence between the camera "C" and the object "P" is given by the following formula: $Pc=CP$, where Pc is the projection of P on the image plane, C the complete camera calibration matrix. The calibration matrix C is related to the device 10 and remains the same for a whole capture session. For example, C can be a 3×4 matrix (12 unknowns).

The method for reconstruction is thus to calculate the calibration matrix C (calibrating the camera) in a reference frame and then to apply the transformation to other frames in order to position as many P points as possible in the space. It should be noted the object P has 3 coordinates and is thus positioned in a 3D space.

The calibration matrix C is calculated knowing a few correspondences between 3D points and their 2D projections on the camera image plane. 2D projections coordinates are known in the image plane, while 3D coordinates are also known in an arbitrary 3D space (i.e. P could be considered for example as the center of the 3D world). Pc=CP provides 2 equations containing 12 unknowns, meaning that at least 6 correspondences must be known in order to solve C. Those correspondences are determined using fiducial based image processing methods.

Once the calibration matrix C is known, a point Q in space can be found through the reverse equation Q=C−1Qc, where C and Qc are known. Q has 3 coordinates that are 3 unknowns. It thus requires another point of view with the same camera to solve the system and position Q in the 3D space.

These calculations are made without any indication of the real dimensions in space. The reconstructed objects have the right geometry but there is no indication about their sizes unless there is in the camera field of view another object whose dimension is well known. This is, however, not prerequisite for the present disclosure.

Computing tools on geometry and trigonometry can be found in open sources libraries (like openCV), libraries that are available in open source since June 2000. Those libraries provide numerous tools on digital pictures analysis, such as automatic 3D camera calibration matrixes calculation (calibrateCamera, calibrationMatrixValues . . . ) or, 3D triangulation from different 2D pictures (triangulatePoints).

Once the calibration is done, the key points 1030 identified in the key point extraction step are placed on the object 50. This is illustrated on FIG. 3D. The 3D points cloud reconstruction is thereafter made "3D slice" by "3D slice" in the obtained relative measurement system, at nodes 2.7 and 2.8. Those 3D slices are added together to build the reconstructed 3D points cloud 1050 as seen on FIG. 3E.

A 3D slice comprises the key points identified from the pictures 1000 for a specific plane The skilled person will understand that this slice by slice 3D cloud reconstruction process could really be compared to the process of printing a regular 2D document that is printed line after line when using a regular inkjet printer. It is also the exact same process when printing a 3D object 50 "slice by slice" while the tray sustaining the printed object 50 is going down each time the printer buses are passing over the previous slice.

The result of the 3D points cloud reconstruction is a file comprising a reconstructed 3D points cloud 1050 in a format understandable to 3D software. A standard file format is a .ply file, which is a regular file format for 3D file. Most 3D software understands and generates this format from and to all other 3D formats (obj, stl, 3DS max, ma, mb . . . ). The ply format is also very efficiently compressible (nondestructive) and transportable through the network, although it is not really an issue here since the 3D points cloud reconstruction and the 3D points cloud comparison are both server side computed. Examples of successfully reconstructed fly files are given in FIG. 5A-5C, showing examples of the object 50 and associated reconstructed points cloud 1050.

The reconstructed 3D points cloud 1050 is forwarded to the storage server 30 for a 3D match search. The 3D match search is done with a 3D points cloud comparison made using the ply files. The comparison compares the user-generated ply file 1050 with known ply files 1052 stored in the 3D database 38. It should be noted that the database ply files 1052, associated with each known object stored in the database, is automatically generated from its 3D model regardless of its original format because the ply files can easily and automatically be generated from most regular files formats. It should be noted that the 3D search match process starts as soon as some 3D points are identified. The 3D search match is then enriched with new reconstructed 3D points as long as the recognition process is going on (i.e. no match is found), giving more and more precision and weight to the 3D part of the recognition.

Two main methods can be used to perform the comparison: 3D geometric comparison or machine learning. The skilled person is aware that 3D geometric comparison is rapidly efficient. Alternative, solutions may be chosen between using existing libraries such as "Points Cloud Libraries" or "Geometry Factory" libraries, which embed root algorithms like point source ray projections, principal component analysis in Eigenspace projections or local sensitivity hashing. Those libraries and root techniques can be applied to compare ply files and find a match, but also to efficiently eliminate non fitting database objects from the identification process, which is almost as important in the matching process.

Machine learning is also very efficient although it needs a high amount of inputs associated to outputs to give good results. Fortunately, the method of the present disclosure allows this high amount of data since database object 50s contain a 3D representation. It is possible to randomly generate a big amount of ply files of any detail level and match them with the known original object 50. This machine learning approach relies on AI algorithms such as HOG linear (Histogram of Oriented Gradients), or cascade classifier of Haar features. It certainly requires an important calculation power since those neural network based techniques are exponential in terms of calculation, but this process can be dealt with independently and upstream the recognition process.

Figures 7, 9:
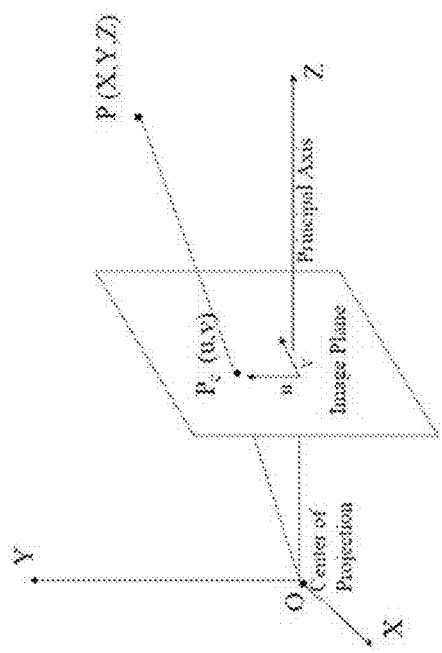
FIG. 7 shows a representation of space which can be used in method of object recognition according to one aspect of the disclosure.
FIG. 9 shows an example of compression usable in a method according to one aspect of the present disclosure.

The 3D points cloud reconstruction obtained from pictures as shown on FIG. 5, allows the use of the 3D envelope to do "segmentation" on the reconstructed object. In other words, the 3D object is used in each picture that has been part of the 3D reconstruction to isolate the object in the picture. This is shown on FIG. 7. A matching 3D object from the 3D database 38 is used to isolate relevant information and obtained a histogram 2010 of the segmented picture. This is the segmentation. The histogram 2010 of the segmented picture can be compared to histograms 2020 of objects in the database 38 and become a criteria of comparison.

Figure 8:
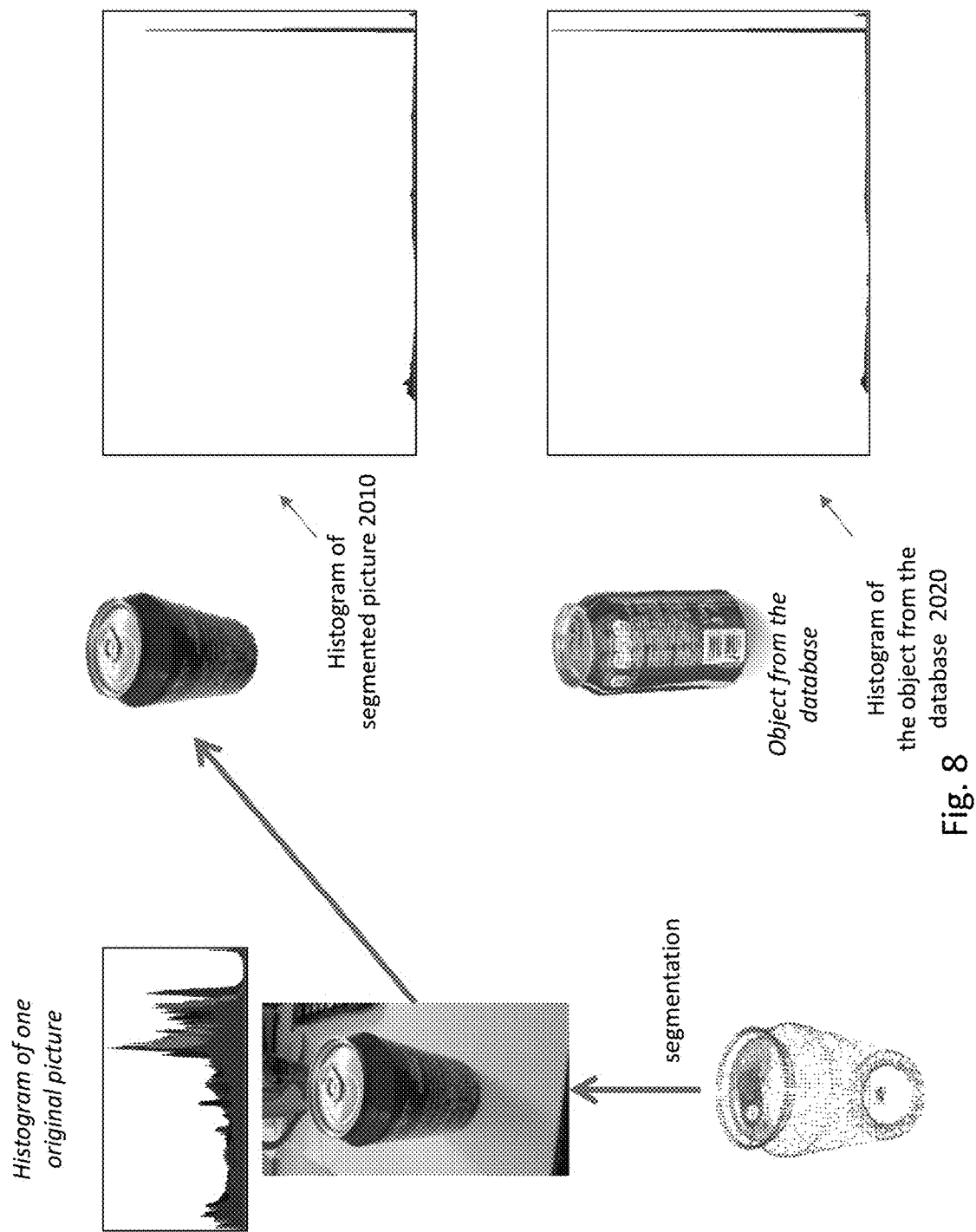
FIG. 8 shows a method of segmentation which can be used in a method of object recognition according to one aspect of the disclosure

This segmentation offers better performances on matching algorithms described in this disclosure, as for example in O.C.R. (characters recognition) only relevant characters are kept in the analysis or in color analysis, giving much more accurate histograms as described on FIG. 8. The skilled person will understand that the method for recognition is an ongoing process. It means that during capture of the pictures data, pictures are sent for computing (node 1.3 & 2.1). Hence, first treatments of first pictures are computed to obtain a computed object 50 while further pictures data are being acquired for the same object 50 to be identified. Indeed, the skilled person will understand that pictures are taken as long as necessary, meaning as long as the object 50 has not been identified (although an overall time out can be set, as explained above). Hence, as noted above, the length of the acquisition time is dynamic and may be adapted depending on the 3D points cloud reconstruction made from the dynamic picture set. Thus, if the computed points cloud is not sufficient in terms of number of points, the length of the frames acquisition is extended. Gyroscope/accelerometer if available on the device can also be used to fill up empty areas with 2D pictures. For example, it has been established so far that a minimum of 20 pictures is required.

Best results are obtained if the angle between two pictures is rather small, about 1 degree; thus, 20 to 30 pictures are required for a 20 to 30 degrees acquisition. An overall time out can be set to avoid infinite looping in the process.

In one aspect, pictures regular compression algorithms are used to speed up this step of picture computing. These algorithms are non-destructive in order to optimize the frame by frame treatments. For example, non-destructive image compression is used in images formats such as "png", "tiff", "gif", "jpeg2000". The pictures regular compression are adapted from open source algorithms, such as entropy coding or dictionary based compression algorithms. This item also includes server side communications between "cloud server"< >"cloud storage": node 2.1.

Entropy coding is a lossless data compression method that gives a specific code to a specific information, this code being easier to transport than the original coding.

For example, let's assume a picture of a car contains 12 M pixels with 10 M red pixels, the entropy coding will affect the value "1" to the red color instead of the (255,0,0) "usual" color codification. Usual and efficient algorithms that can be easily implemented are "Huffman coding" and, "Shannon-Fano coding", an optimized version of Huffman coding.

Another compression method could be the Lempel-Ziv-Welch-Algorithm (LZW) algorithm. This method of compression assumes that the item to encode is available as a character chain, which is the definition of any digital signal. The LZW algorithm encodes sequences of characters by creating new characters in a "character dictionary" from read sequences, as seen on the tables of FIG. 9.

The dictionary starts with 2 characters: 0 et 1. While reading the first character "1", it will find the new character "10" made of the 2 first characters of the original chain and will add it to the dictionary (character #2). While reading the second "0", it will had the new character "00" to the dictionary (character #3). While reading the 3rd character of the chain, it will add to the dictionary "01" (character #4). While reading the 4th character, it will add "11" (character #5) to the dictionary. The 5th and 6th character are "1" and "1", which is character #5 of the dictionary. In the meantime, "110" is added to the dictionary as character #6. The compression continues further in the same manner. In the end, the original chain of 15 items is coded with a chain of 8 items.

In one embodiment, server side computing involves many techniques processed simultaneously in order to eliminate non-fitting object from the object database 35, 38. Each time a non-fitting object is eliminated, the technique used to eliminate this non fitting object is remembered, thus giving a weight to the efficiency of this technique for this object 50 to be identified. This weight is then used to prioritize and speed up the process. The weight is also stored for further statistics. For example, should an object 50 have characters on it, all the known objects stored in the database without characters are immediately eliminated; should the red color be identified in an object 50, all known objects without red stored in the database would be eliminated.

Another example is the QR-code or Bar-code: should the object 50 have one of those, the matching would immediately be found and displayed. This specific embodiment is not the purpose of the present disclosure but is given as an example of the recognition process.

It is important to understand that the present system and method is not meant to obtain a dense 3D reconstruction of the object 50. However, 3D points cloud reconstruction can be computed with efficiency and accuracy from several views of the object 50. This is a tradeoff between accuracy and resources: the more views, the more accuracy in the points cloud but the more calculation to compute.

Once the object 50 has been identified after the match search in either the first database 35 or the 3D database 38, the information is returned to the device 10, for display and/or further action on the device 10 under at least one of many forms: 3D interactive representation compatible with all devices, available metadata, 3D printable compatible export . . . . This also includes all social networks sharing and usual search engines since text metadata is also embedded with the object 50.

The method for recognition is preferably shown in real time to the user through a user friendly interface. The main parameter is the number of objects still matching from the database. The process ends "OK" when only one object 50 is found, "KO" when no match is found or on time out as explained above. Nevertheless, the user can be asked to help the matching process through simple "MCQ" (Multiple Choice Questions) questions to ease the recognition (node 4.2). Those questions/answers can be very simple: size/dimension, material, brand, family of object 50 (food, accessory, car . . . ), accuracy of 2D capture . . . . Those questions can be asked according to at least one of the ongoing process, previous decimations in the objects database and remaining objects metadata.

What is claimed is:

1. A computer implemented method of object recognition of an object to be identified, the method comprising the steps of:
   acquiring, by a mobile device, a plurality of pictures of said object;
   sending the acquired pictures to a cloud server;
   reconstructing, by the cloud server, a 3D model of the object, to derive the 3D points cloud reconstruction of the object, wherein the step of reconstructing, by the cloud server, a 3D model of the object comprises:
     obtaining a plurality of pictures of the object;
     extracting a plurality of key points that can be correlated in said plurality of pictures of the object, wherein at least two pictures of the plurality of pictures show at least two different viewpoints of the object;
     placing the key points on the object;
     defining a plurality of 3D slices of the object, wherein a 3D slice comprises at least one key point; and
     adding the 3D slices to build a reconstructed 3D points cloud of the object; and
   performing a 3D match search in a 3D database using the 3D points cloud reconstruction, to identify the object, the 3D match search comprising comparing the 3D points cloud reconstruction of the object with 3D points clouds of known objects stored in the 3D database; and
   wherein the step of acquiring a plurality of pictures comprises:
     extracting said pictures from a video sequence, the method comprising dynamically adjusting the acquisition parameter depending on the 3D points cloud reconstruction, wherein pictures from the video sequence are saved every «n» frame, and wherein «n» being adjusted dynamically or by the user, in particular wherein n is given a higher value at the start of the method and decreases as the reconstruction becomes more accurate.

2. The method according to claim 1, further comprising:
   performing a first search match in a first database, the first search match being performed using 2D recognition techniques including at least one of Optical Character Recognition, Scale Invariant Feature Transform based imaging, color gradient analysis.

3. The method of claim 1, wherein the steps of the method are performed concurrently until the object has been identified in at least one of the first database and the 3D database, and particular pictures are acquired as long as the object has not been acquired or until a time out has been reached.

4. The method of claim 1, wherein the search match in the 3D database includes at least one of machine learning or 3D geometric comparison.

5. The method of claim 1, further comprising:
displaying in real time information pertaining the method on the mobile device, wherein the mobile device comprises an input device allowing a user to enter input data concerning the object to be identified, and wherein the 2D or 3D match search are adapted depending on the input data.

6. A computer program product comprising a non-transitory computer medium having stored therein to cause a computer to perform the steps of a method according to claim 1.

7. The method according to claim 1, wherein the step of reconstructing, by the cloud server, a 3D model of the object comprises:
defining an initial set of searchable points in a first picture of the plurality of pictures; and
identifying some of the searchable points in the remaining pictures of the plurality of pictures, to extract the key points.

8. The method of claim 1, the step of reconstructing, by the cloud server, a 3D model of the object further comprising:
computing a calibration matrix in a reference frame to derive a relative measurement system.

9. The method of claim 8, wherein the 3D slices are added in the obtained relative measurement system.

\* \* \* \* \*